United States Patent [19]

Carpenter

[11] Patent Number: 4,945,758
[45] Date of Patent: Aug. 7, 1990

[54] METHOD AND APPARATUS FOR MONITORING THE INTERIOR SURFACE OF A PIPELINE

[75] Inventor: Sammy Carpenter, Dhahran, Saudi Arabia

[73] Assignee: Arabian American Oil Company, Dhahran, Saudi Arabia

[21] Appl. No.: 244,520

[22] Filed: Sep. 9, 1988

Related U.S. Application Data

[63] Continuation of Ser. No. 55,068, May 28, 1987, abandoned.

[51] Int. Cl.⁵ ............................................. G01N 17/00
[52] U.S. Cl. ........................................................ 73/86
[58] Field of Search ...................... 166/902; 15/104.16; 73/86, 865.8, 866.5; 137/551; 204/404, 409, 411, 129.2; 138/36

[56] References Cited

U.S. PATENT DOCUMENTS

| | | | |
|---|---|---|---|
| 2,083,011 | 6/1937 | Ducommon | 138/36 |
| 2,484,279 | 10/1949 | Folz | 73/86 |
| 2,664,744 | 1/1954 | Bilhartz et al. | 422/53 |
| 2,752,228 | 6/1956 | Gould | 73/86 |
| 3,027,946 | 4/1962 | Paskevich et al. | 15/104.16 |
| 3,055,637 | 9/1962 | Moore, Jr. | 15/104.16 |
| 3,174,332 | 3/1965 | Echtler, Jr. et al. | 73/86 |
| 3,208,460 | 9/1965 | Heinicke | 15/104.16 |
| 3,342,064 | 9/1967 | Blattner | 73/86 |
| 3,948,744 | 4/1976 | Cushing | 204/404 |
| 4,245,698 | 1/1981 | Berkowitz et al. | 148/11.5 N |
| 4,309,899 | 1/1982 | Torres | 73/86 |
| 4,631,961 | 12/1986 | Yohe et al. | 73/86 |

FOREIGN PATENT DOCUMENTS 8606165 10/1986 PCT Int'l Appl. ................ 73/865.8

Primary Examiner—Robert R. Raevis
Attorney, Agent, or Firm—Thomas E. Spath

[57] ABSTRACT

A sidestream pipeline, adapted for attachment to a mainstream pipeline, is provided with end closures to permit the introduction of mechanical cleaning devices or chemical compositions to the sidestream pipeline to remove biofilm and treat corrosion-causing constituents; also provided are a plurality of removable coupons closely fitting within holes in the sidestream pipeline wall, and duplicating the material and configuration of the interior surface of the mainstream pipeline. The coupons can be individually withdrawn from the lowermost surface position during cleaning operations to avoid contact with the mechanical cleaning devices and can be isolated from teh chemical treatment. The coupons are removable for laboratory study and analysis.

21 Claims, 3 Drawing Sheets

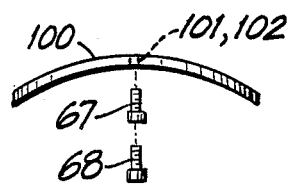
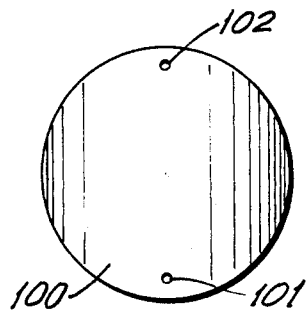
FIG.4A    FIG.4B
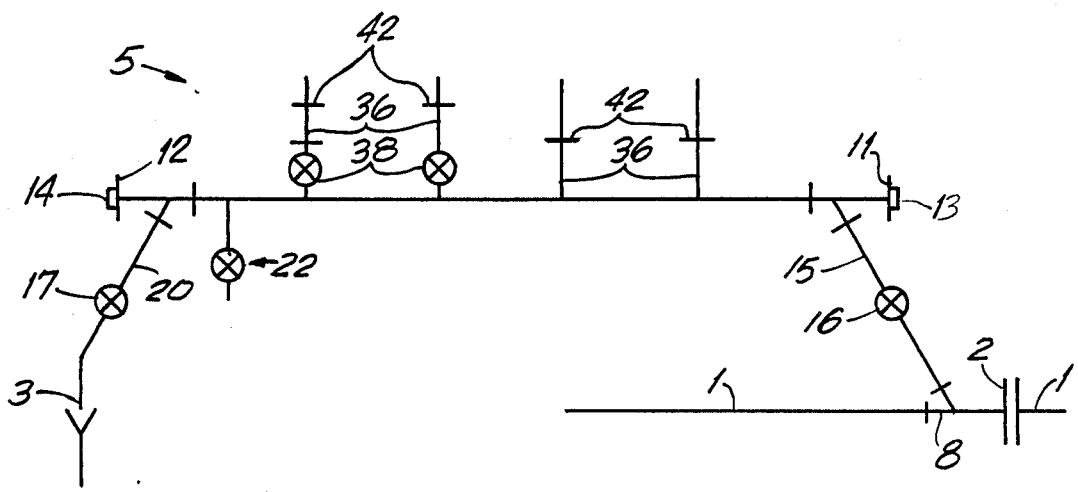
FIG.5

METHOD AND APPARATUS FOR MONITORING THE INTERIOR SURFACE OF A PIPELINE

This application is a continuation of U.S. Ser. No. 55,068 now abandoned.

BACKGROUND OF THE INVENTION

1. Field of the Invention

The present invention relates to a method and apparatus for monitoring the effects of mechanical, chemical and biochemical cleaning techniques on the interior surface of pipelines.

When the water injection method is used in the recovery of crude oil from underground formations, it has been found that sulfate reducing bacteria (SRB) and general aerobic bacteria (GAB) grow on the interior surfaces of the system and produce a layer of biofilm. This biofilm produces adverse effects. First, the bacteria multiply within this layer and impede the flow of the water in the pipeline. Eventually the biofilm "sloughs" into the flow of the pipeline and is transferred to the formation where it interferes with the flow of water into the formation. Second, the interior surface of the pipeline is subject to corrosion which form under the biofilm and which can result in premature failure of the pipeline.

With water injection systems, two cleaning techniques used to reduce the corrosion and biofilm accumulation in the pipeline are chemical, or biochemical, and mechanical methods. In the first method, biocides, or bactericides, are injected into the pipeline. These bactericides kill the bacteria that forms the biofilm layer. In the second method, mechanical scraping is carried out to remove solids from the interior surface of the pipeline.

At present, little is known about the character of the biofilm, the parameters which effect the rate of biofilm build up, or the degree of corrosion that occurs under the biofilm layer. Likewise, little is known about the effects and impacts of either mechanical or biochemical cleaning techniques, their interaction with one another, or their cost effectiveness. For example, one variable that affects biofilm buildup and corrosion is the flow rate in the pipeline, and it is desirable for the purposes of evaluation to determine the effect of flow rate on the effectiveness of the cleaning techniques.

2. Description of the Prior Art

Various methods are known to the prior art for measuring the corrosive properties of a process stream or measuring the rate of corrosion of the inner surface of a conduit. U.S. Pat. No. 2,484,279 discloses a method for testing the corrosive properties of a process stream which employs a sidestream pipeline in which corrosion testing samples are suspended in the fluid flow. U.S. Pat. No. 2,083,011 discloses a device for determining the rate of corrosion of a conduit in which a removable plug made of the same material as the conduit is placed in a hole in the wall of the conduit. Upon removal of the plug its thickness is measured to determine the rate of corrosion of the plug and hence the rate of corrosion of the conduit itself.

However, the prior art does not provide methods or apparatus for monitoring the interior surface of a pipeline to determine the rate of corrosion and biological growth and the effect of various cleaning operations.

It is therefore an object of the present invention to provide a method and apparatus for determining the growth characteristics and corrosive effect of a biofilm on the inner surface of crude oil pipelines.

A further object of the present invention is to provide a method and apparatus for locally applying pipeline cleaning techniques, in the form of slugs of chemical treatment, such as bactericides, and mechanical scraping, so that their effects can be visually observed and quantitatively measured.

A further object of the present invention is to provide a representative method and apparatus for monitoring the nature of biofilm and the effects of pipeline cleaning techniques in which the flow of the mainstream pipeline is not interrupted.

Another object of the present invention is to provide a method and apparatus for monitoring the nature of a biofilm and the effects of pipeline cleaning techniques under various flow rates and conditions.

It is also an object of this invention to provide a coupon of improved design and apparatus for aligning and positioning the coupon in the pipeline.

A further objective of the present invention is to provide a method and apparatus for safely and conveniently monitoring the effects of pipeline cleaning techniques on pipelines that operate at high pressures.

A still further objective of the present invention is to provide means for monitoring the condition of the interior surface of a pipeline which will eliminate the possibility of oxygen ingress into the mainstream pipeline.

SUMMARY OF THE INVENTION

In accordance with the present invention these and other objectives are achieved by providing one or more sidestream pipelines attached to a mainstream pipeline in a manner that a controlled representative portion of the fluid flow in the mainstream pipeline is diverted through the sidestream pipeline thereby varying or duplicating the fluid flow conditions present in the mainstream pipeline. The sidestream pipeline is adapted to receive a plurality of coupons which precisely duplicate the material and configuration of the interior surface of the pipeline. The sidestream pipeline is also adapted to receive application of chemical and mechanical cleaning methods without affecting the flow in the mainstream pipeline. Each coupon is further adapted to be individually withdrawn from its position in the wall of the sidestream pipeline so that the effect of cleaning techniques which are applied locally to the sidestream pipeline can be determined.

In a preferred embodiment, the coupons have a concave surface and are aligned and positioned in holes in the sidestream pipeline so that they closely conform to the configuration of the interior wall of the sidestream pipeline, are aligned and fit flush with the inner surface of the sidestream pipeline and do not impede the chemical or mechanical cleaning techniques employed.

The method of the invention further contemplates the withdrawal of individual coupons from the inner surface during application of cleaning methods to permit the comparative analysis of biological growth and of corrosion, and of the effectiveness of the periodic application of cleaning methods.

BRIEF DESCRIPTION OF THE DRAWINGS

A detailed description of the invention will be made with reference to the accompanying drawings, wherein like numerals designate corresponding elements in the several figures.

FIG. 4A is a side view of the coupon shown in FIG. 3.

FIG. 4B is a top view of the coupon shown in FIG. 4A.

FIG. 5 is a schematic view of another embodiment of the present invention.

DESCRIPTION OF THE PREFERRED EMBODIMENTS

Figure 1:
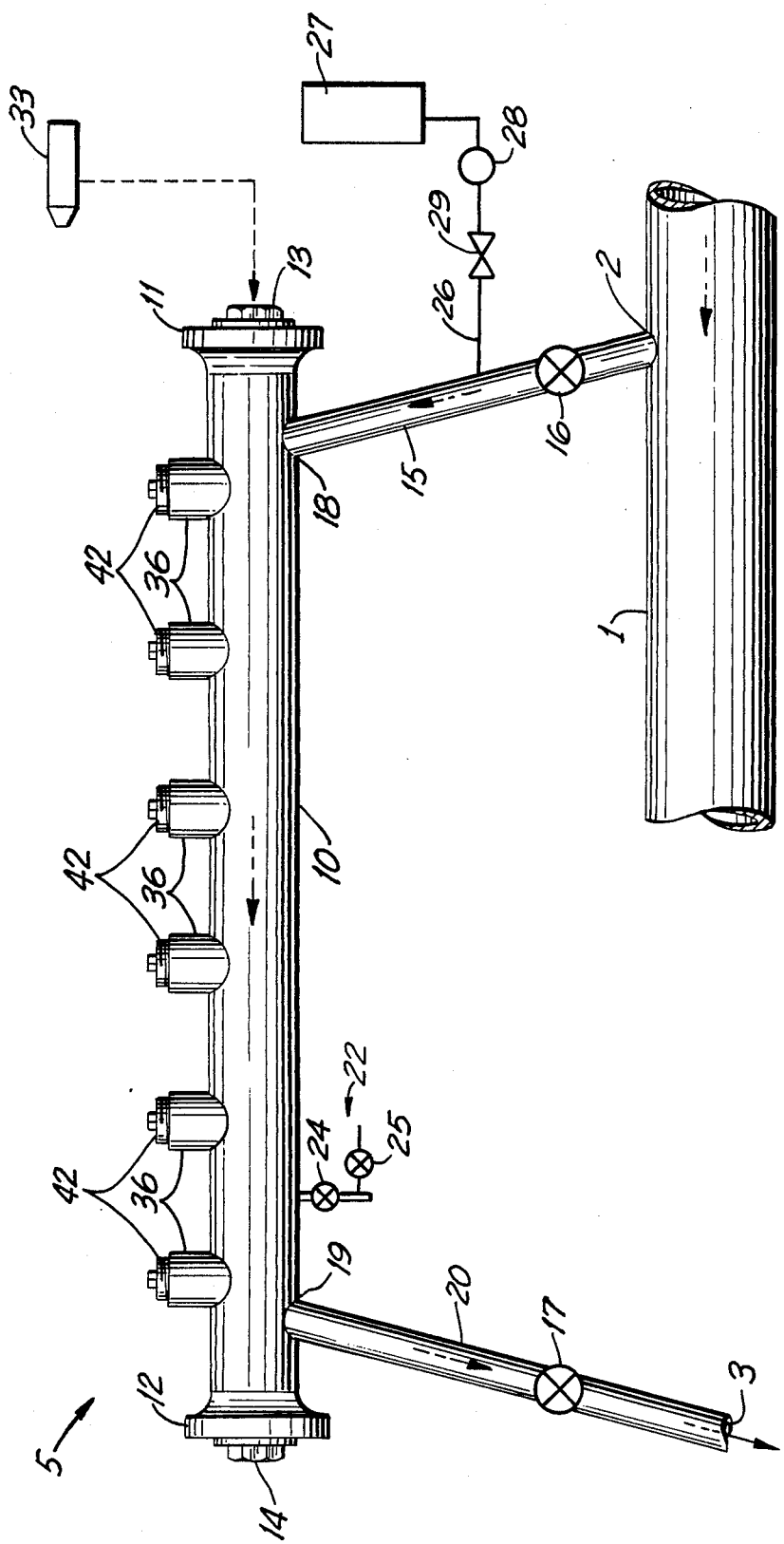
FIG. 1 is a side view of one embodiment of the present invention.

Referring to FIG. 1 there is shown mainstream pipeline 1 with sidestream assembly 5 of the present invention. Sidestream pipeline 10 is a section of pipe adapted to duplicate the conditions in mainstream pipeline 1. All pipeline or conduit sections are fabricated from the same material as mainstream pipeline 1. Typical mainstream diameters range from four inches to five feet. Sidestream pipeline 10 is provided with threaded end flanges 11 and 12. Removable end plugs 13 and 14 are cylindrical, externally threaded, to mate with end flanges 11 and 12, respectively. Either or both of end plugs 13 and 14 can be removed by unscrewing them, when sidestream pipeline 10 is subjected to the cleaning techniques as described below.

Sidestream pipeline 10 is provided with holes 18 and 19 adjacent the end flanges. Upstream bypass conduit 15 and downstream bypass conduit 20 are short sections of pipe which, in this embodiment are welded at one end to sidestream pipeline 10 at holes 18 and 19, respectively. The other end of upstream bypass conduit 15 is welded to mainstream pipeline 1 at hole 2. This allows a portion of the fluid flow of mainstream pipeline 1 to be diverted into upstream bypass conduit 15, to sidestream pipeline 10, to downstream bypass conduit 20, and thereafter discharged from end 3 of conduit 20 into a sewer, low pressure line, or other suitable discharge means. As an alternative to the welded terminations described above, T-fittings and threaded pipe can be employed in either, or both the mainstream or sidestream pipelines to complete the bypass assembly.

Upstream bypass conduit 15 and downstream bypass conduit 20 have isolating means in the form of valves 16 and 17, respectively, which control the fluid flow to sidestream pipeline 10. In this way the effects of different flow rates on the growth of the biofilm layer and the rate of corrosion can be monitored. By closing valve 16, the flow into sidestream pipeline 10 is cut off, and the sidestream pipeline 10 is isolated from the mainstream pipeline 1. Pressure relief assembly 22, comprising pressure relief isolation valve 24 and pressure relief bleeder valve 25, is activated to relieve the internal pressure on system 5. It is necessary to shut down sidestream pipeline 10 in this way before inspecting the coupons 100, since this inspection involves the opening of sidestream system 5.

Sidestream pipeline 10, bypass conduits 15 and 20 and valves 16 and 17 constitute sidestream assembly 5. This assembly can be connected to pipelines that operate at high pressures since valve 16 functions to reduce the pressure on the sidestream pipeline. The sidestream pipeline should be tested to about 180 psig.

In the embodiment of FIG. 1, biocide storage tank 27 is connected to bypass conduit 15 via feedline 26. The output of biocide injection pump 28 is controlled by metering valve 29, which also isolates the biocide feed from the rest of the system when it is not in use.

In one mode of operation, a conventional mechanical scraping device 33, such as that manufactured by Knapp International, Inc. of Houston, Texas, is loaded into its launcher (not shown) which is attached to upstream flange 11 in place of closure 13. The scraper is swept downstream by the flowing fluid to a receiver which is installed on flange 12 in place of closure 14.

Figure 2:
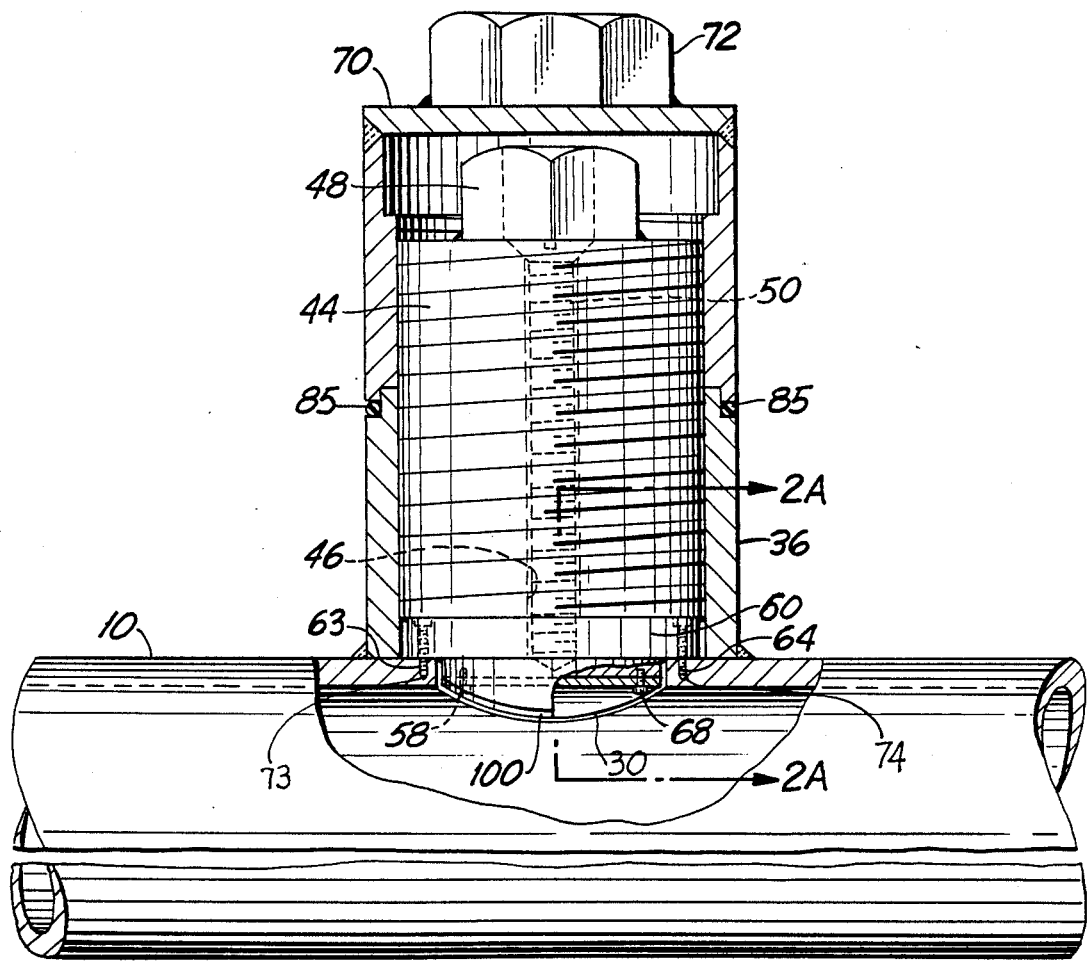
FIG. 2 is a cross-sectional view showing details of parts of the monitoring apparatus shown in FIG. 1.

In the embodiment of FIG. 1 sidestream pipeline 10 is provided with six openings which are adapted to receive close fitting test coupons 100. As shown in FIG. 2 bosses 36 are hollow cylinders with threaded inner surfaces, butt welded around circular openings 30 in sidestream pipeline 10, having axes radial to the pipeline. Each boss has a diameter larger than the diameter of the openings 30, and is concentrically welded to form a leak-tight seal capable of withstanding pipeline operating pressures.

Bosses 36, coupon transporting assemblies 42, protective caps 70 and seals 85 constitute fluid tight alignment means for inserting the coupons 100 and for varying their position with respect to the inner surface of sidestream pipeline 10.

As shown in FIG. 2, cap 70 is threaded on to plug 44 to close the open end of boss 36, and when the sidestream system 5 is in operation, six caps 70 are to be placed on the respective plugs 44 and bosses 36 of FIG. 1. In the embodiment shown, cap bolt head 72 is butt welded to the center of the top of cap 70 to facilitate tightening and removal using conventional tools. Gasket 85 provides a fluid-tight seal between boss 36 and cap 70.

Figure 3:
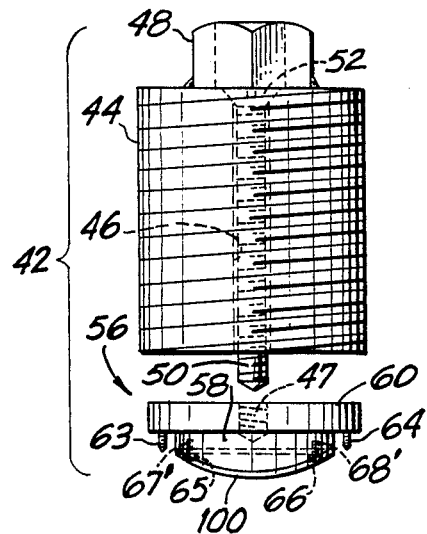
FIG. 3 illustrates additional details of the monitoring apparatus shown in FIG. 2.

FIG. 3 illustrates a typical coupon transporting assembly 42 and shows coupon holder 56 in more detail. Coupon transporting assembly 42 which consists of externally threaded plug 44, bolt head 48, threaded shaft 50 and coupon holder 56.

Plug 44 is preferably a solid cylinder with an outer diameter 1/32 of an inch smaller than the inner diameter of boss 36 and a threaded outer surface adapted to mate with the inner surface of boss 36. Plug 44 has shaft retaining hole 46 through its center, which is preferably unthreaded and which extends the entire length of plug 44.

Bolt head 48 is hexagonal in shape, butt welded to the center of the top of plug 44, and hollow with an inner diameter large enough for the head 52 of shaft 50 to pass freely through it. By rotating bolt head 48 coupon transporting assembly 42 can be raised and lowered inside of boss 36.

Threaded shaft 50 is an elongated threaded member, which in the embodiment shown is a flat head screw, that slides within hole 46 of plug 44. Its length is about ¼ of an inch longer than the length of plug 44. The head 52 of the shaft rests upon the top of the plug 44 as shown in FIG. 3, the diameter of the hole 46 being smaller than the diameter of the head 52.

Coupon holder 56 consists of sidestream mating plate 58, plug mating plate 60, and alignment pins 63 and 64. Alignment pins are adapted to mate with corresponding holes 73 and 74 in the sidestream pipeline 10 adjacent hole 30. Alternatively, a single pin or keyway can be provided for alignment purposes. Plug mating plate 60 is circular with a diameter slightly less than the inner diameter of boss 36, and is adapted to pass freely within boss 36. Removal screw hole 47 is coaxial with the center of plug mating plate 60 and extends about halfway through the coupon holder 56. Sidestream mating plate 58 is cylindrical with a diameter about 1/16 to 1/32 of an inch less than the diameter of hole 30, and will also pass freely within boss 36 since it is smaller than plate 60. The top of sidestream mating plate 58 is attached to the bottom of plug mating plate 60 so that they are concentric. Alternatively, they can be fabricated as a single unit. The bottom of sidestream mating plate 58 is provided with a concave surface that precisely duplicates the configuration of the interior wall of sidestream pipeline 10. Plate 58 can conveniently be fabricated from a typical section of the same type of pipe as sidestream pipeline 10. The bottom surface of sidestream mating plate 58 also has two coupon screw holes 65 and 66. The tip of shaft 50 is threaded into the removal screw hole 47.

Figure 2A:
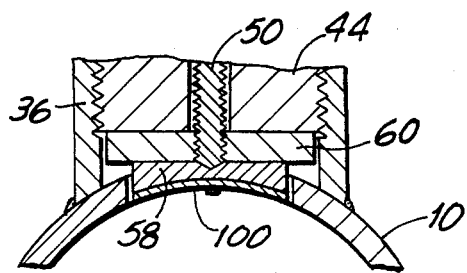
FIG. 2A is a partial cross-sectional view taken along line 2A—2A.

The monitoring means consists of coupon 100, shown in FIGS. 4A and 4B. In the embodiment shown in FIG. 1, six coupons 100 are attached to their respective coupon transporting assemblies 42. Coupon 100 is a wafer-like, circular piece of metal fabricated from the same material as mainstream pipeline 1, and preferably has a large surface area-to-weight ratio. Its diameter is about 1/16 to 1/32 of an inch less than the diameter of opening 30, and adapted to pass freely within the opening 30 and boss 36. The surface of coupon 100 precisely duplicates the configuration of the interior wall of sidestream pipeline 10. It is concave and fits flush and aligns with the inner surface of sidestream pipeline 10 as is shown in the partial cross-sectional view of FIG. 2A. As shown in FIG. 4A, two coupon screws 67 and 68 pass through coupon mounting holes 101 and 102 in coupon 100 and are threaded into holes 65 and 66 to hold the coupon 100 in place.

Coupon transporting assembly 42 is prepared for use in the following manner. Coupon 100 is attached to coupon holder 56 by inserting coupon screws 67 and 68 through coupon holes 101 and 102 and into coupon screw holes 67' and 68'. Holder 56, with coupon down, is dropped into boss 36 and pins 63 and 64 fitted into holes 73 and 74, respectively. The coupon holder fits down into hole 30 so that the coupon is flush with the inside of the pipe. Coupon transporting assembly 42 is screwed into boss 36 by rotating bolt head 48, and shaft 50 is threaded into the hole 47 in coupon holder 56 through hollow bolt head 48 and hole 46. Alignment pins 63 and 64 prevent rotation of coupon holder 60. Coupon holder 56 is thus held in place by the force of plug 44 against surface 60.

Coupon transporting assembly 42 can be withdrawn from its position flush with the inner surface of sidestream pipeline 10 by rotating bolt head 48 to the left. Plug assembly 42 will move up and away from the fluid flow of sidestream pipeline 10, carrying with it the coupon holder 56 and coupon 100. After the mechanical scraping has been completed, coupon transporting assembly 42 can be re-inserted to its original position flush with the inner surface of sidestream pipeline 10 as described above.

An alternative embodiment is shown schematically in FIG. 5 wherein like reference numerals correspond to those elements of FIGS. 1-4. The sidestream assembly is attached to a bypass flanged fitting 8, which is adapted to mate with a corresponding flange affixed to mainstream pipeline 1. In this embodiment, it is contemplated that assembly 5 is entirely prefabricated and can be connected to an existing pipeline 1 at flange 8. Considerations of ease and the ability to quickly install the assembly can be very important if tests are to be conducted on submerged pipelines.

As will be apparent to one skilled in the art, two, three, or more sidestream pipeline assemblies can be installed in parallel, each with its own set of flow controls and coupons. This manifolding of test sidestream pipelines permits simultaneous monitoring of cleaning techniques under various flow rates and conditions. Several smaller diameter sidestream pipelines can be inserted into the flow of a single larger mainstream pipeline.

With further references to FIG. 5, there are shown means 38 for isolating the coupon transporting assembly 42 from the sidestream pipeline 10, as during injection of a liquid biocidal treatment. Isolating means 38 can be a ball valve or a gate valve having an opening the same diameter as internally threaded boss 36, to permit the coupon holder assembly to pass through. Isolating means 38 is secured about hole 30 and elements 36 and 42 mounted on the valve outlet side for operation generally as described with reference to the embodiment of FIGS. 1-4. As will be apparent to one familiar with the art, the length of the member corresponding to insertion shaft 50 will have to be increased to account for the greater distance travelled by the coupon to reach the other side of the ball valve.

During mechanical cleaning operations, one or more coupons can be withdrawn from their positions flush with the pipeline so that they remain untouched by the mechanical scraping device passing through the sidestream pipeline. When it is desired to isolate one or more coupons from chemical treatments injected into the sidestream pipeline, the coupons are withdrawn upwardly until they are on the exterior side of the gate or ball valve, and the valves are then closed. Following chemical treatment, and flushing if necessary, the valves are opened and the coupon re-inserted through the valve body to its original position.

Pipeline Monitoring Methods

Coupon 100 of coupon transporting assembly 42 can be withdrawn from its position at the surface of sidestream pipeline 10 during the mechanical scraping of sidestream pipeline 10 so that coupon 100 and any biofilm present is not contacted. By withdrawing and re-inserting one or more of the plug assemblies at selected times, the plug assemblies 42 can be subjected to varied degrees of mechanical scraping. In this way the effect of the mechanical cleaning procedures and devices can be determined by comparison of coupons which have been subjected to a different number or type of scraping.

After sidestream pipeline 10 has been operating for a predetermined length of time with the fluid flow of mainstream pipeline 1 flowing through it, and the pipeline cleaning techniques have been locally applied to sidestream pipeline 10 a number of times, the six coupons 100 are removed for inspection. First, valve 16 is closed to shut down sidestream pipeline 10. Any internal pressure within the sidestream pipeline is relieved, and caps 70 removed. Coupon transporting assemblies 42 are then removed from bosses 36. Referring to FIG. 2, removal of assemblies 42 is accomplished by turning bolt head 48 to the left until assembly 42 clears the top of boss 36. Referring to FIG. 3, coupon 100 is then removed by unscrewing coupon screws 67 and 68. Coupon 100 can then be inspected and subjected to desired tests.

Coupon 100 provides data as to the condition of the interior surface of sidestream pipeline 10. The large concave surface of coupon 100 is representative of the internal surface area of sidestream pipeline 10, which in turn is representative of the interior of mainstream pipeline 1 itself. Therefore, the surface of coupon 100 that is exposed to the fluid flow of sidestream pipeline 10 will be highly representative of the condition of the inner surface of mainstream pipeline 1.

Once removed from sidestream pipeline 10, coupon 100 can be subjected to a variety of tests. Due to its relatively large surface area, a representative sample of biofilm will be available which can be measured, weighed, and tested. Furthermore, the wafer-like nature of coupon 100 results in a relatively low weight so that fine corrosion measurements can be carried out by noting its original weight and then measuring the weight loss of the coupon after it has been cleaned.

Both the mainstream and sidestream can advantageously be provided with suitable flow rate indicators, pressure gauges, and other instrumentation (not shown), that is well known to those familiar with the art to aid in replicating conditions in the two pipelines, as well as for determining which factors effect the growth and removal of biofilm, and the corrosion rate.

From the above description it is apparent that the coupons which serve as monitoring surfaces, can be raised and lowered to allow passage of pipe scrapers without shutting down the pipeline system. The invention eliminates the possibility of oxygen ingress into the system which would effect the rate of biofilm and bacterial growth thereby allowing a study of scraping frequency versus (a) removal of bacteria and (b) removal of deposits without disturbing the system to thereby simulate actual operating conditions. The large surface area of the coupon simulates the actual internal surface of the pipe and gives a better visual determination of corrosion and solids buildup. Because the coupon is thin and relatively lightweight, the degree of corrosion can be directly determined by weight differential measurements.

The apparatus and method of this invention is used to advantage to determine the optimum frequency for mechanical or chemical cleaning of pipelines. The effect on SRB and GAB growth and biofilm tenacity and characteristics and corrosion is determined at different flow rates in bactericide treated and untreated systems under field conditions. Tests are conducted under cumulative and non-cumulative growth and scraping conditions. For example, baselines at different flow rates are established by analysis of the coupons in the non-scraped position, both with and without biocide injections. The effect of the frequency of scraping can also be determined as follows:

1. Frequent scraping (weekly) will restore the surface to a near new condition, which will permit the biocide to kill bacteria between scrapings and result in a low bacteria count and pitting rate, with the potential for a high general corrosion rate since the natural polarization of the steel pipe could be disrupted, and little protective iron sulfide film will form on the pipe surface;

2. Less frequent scraping (monthly) will allow protective sulfide film to form, and scraping will be frequent enough to prevent pitting, although bacteria will always be found in the system; and 3. Infrequent scraping will allow bacteria to form under scale and cause pits in pipeline surface. The invention is used to study the growth of biofilm and the effect of mechanical and chemical cleaning methods in sea water injection systems. Information can be developed on the effect, over time, of biofilm growth at different flow rates and frequencies of cleaning. Studies include analysis of coupons exposed to sea water in pipelines for varying times and at varying flow rates in the sidestream test apparatus to determine the effect of exposure time and velocity on the biofilm and corrosion rate. Similar tests are used to determine the effect on the system of the treatment with biocides of varying concentrations and frequencies. Similar tests are employed to determine the effect of scraping on biofilm and corrosion at various frequencies.

The embodiment described above is to be considered in all respects as illustrative and not restrictive. The scope of the invention is indicated by the appended claims rather than the foregoing description and all changes which come within the meaning and range of equivalency are therefore to be embraced in the claims.

What is claimed is:

1. In an apparatus for monitoring the effects attendant the flow of a pressurized fluid on the interior surface of a mainstream pipeline comprising
    (a) a sidestream pipeline;
    (b) an upstream bypass conduit adapted to divert a portion of the fluid flow from the mainstream pipeline to the sidestream pipeline; and
    (c) an upstream conduit bypass valve adapted to control the fluid flow to the sidestream pipeline; the improvement which comprises:
    (i) in combination, a plurality of fluid tight coupon alignment means secured to the exterior surface of the sidestream pipeline along its longitudinal axis and communicating with the interior of the sidestream pipeline;
    (ii) a removable coupon transporting assembly adapted to mate with, and adjustably positioned within each of the fluid tight coupon alignment means and adapted to move radially outward from a position proximate the interior surface of the sidestream pipeline;
    (iii) a thin waferlike having a large surface area-to-weight ratio detachably affixed to each coupon transporting assembly and communicating with the interior of the sidestream pipeline, each coupon adapted to be positioned flush with the interior of the pipeline and not projecting beyond the inner surface of said pipeline, the shape of the coupon conforming to that of the inner surface of the pipeline; and
    (iv) access means communicating with at least the upstream end of the sidestream pipeline adapted to permit treatment of the interior surface of the sidestream pipeline by means selected from the group consisting of mechanical scraping devices and liquid biocidal chemical agents.

2. The apparatus of claim 1 where the sidestream pipeline is of a smaller diameter than the mainstream pipeline.

3. The apparatus of claim 1 where the sidestream pipeline and the coupons are fabricated from the same material as the mainstream pipeline.

4. The apparatus of claim 1 where the sidestream pipeline further comprises means for monitoring the internal fluid pressure and flow conditions.

5. The apparatus of claim 1 where the coupons communicate with the interior of the sidestream pipeline through generally circular openings in the pipeline wall.

6. The apparatus of claim 5 where the diameter of the coupons is approximately 2 mm. less than the diameter of the openings in the pipeline wall.

7. The apparatus of claim 1 where each of the coupons is affixed to a holder and said holder is adapted to mate with the fluid tight coupon alignment means at the exterior of the sidestream pipeline wall.

8. The apparatus of claim 1 where the fluid tight coupon alignment means further comprises a generally cylindrical member fixed to the external surface of the sidestream pipeline and having its central axis radial to the sidestream pipeline.

9. The apparatus of claim 8 in which the axis of the generally cylindrical member is concentric with the opening in the sidestream pipeline wall.

10. The apparatus of claim 9 in which the coupon transporting assembly is adapted to rotationally mate with the generally cylindrical member.

11. The apparatus of claim 9 in which the coupon transporting assembly comprises an externally threaded plug and a coupon holder linked together by an insertion shaft.

12. The apparatus of claim 11 in which the coupon is removably attached to the coupon holder.

13. The apparatus of claim 11 in which each plug is adapted to receive an externally applied rotational force at its upper surface.

14. The apparatus of claim 11 in which the coupon holders are adapted to mate with the wall of the sidestream pipeline by means of at least one pin.

15. The apparatus of claim 8 in which the fluid tight alignment means is further provided with a removable projective cap.

16. The apparatus of claim 1 in which the bypass conduit is adapted to mate with a flanged fitting on the mainstream pipeline.

17. In the method for monitoring the condition of the interior surface of a mainstream pipeline carrying a pressurized fluid flow which method includes the steps of inspecting a coupon which has been exposed to the fluid flow in sidestream pipeline connected to the mainstream pipeline, the improvement which comprises the steps of:
  (a) mechanically positioning one coupon in each of a plurality of adjacent openings along the longitudinal axis of the sidestream pipeline, where the surface of said coupons exposed to the fluid flow are, in a first position aligned with, and conform to the configuration of the interior surface of the sidestream pipeline adjacent said openings;
  (b) passing the pressurized fluid through the mainstream and sidestream pipelines for a period of time and under conditions sufficient to effect a change to the interior surface of the sidestream pipeline;
  (c) mechanically withdrawing one or more but not all of the coupons from the first position to a second position on the exterior of the sidestream pipeline which is outwardly displaced from the longitudinal axis of the sidestream pipeline;
  (d) subjecting the interior surface of the sidestream pipeline to treatment by means of a mechanical scraper while the coupon or coupons in the second position are isolated from said treatment;
  (e) relieving the pressure on the fluid in the sidestream pipeline;
  (f) removing one or more of the coupons from the sidestream pipeline; and
  (g) inspecting and comparing the coupons, whereby the effects of varied treatment means on the exposed surface of the coupons are determined.

18. In the method for monitoring the condition of the interior surface of a mainstream pipeline carrying a pressurized fluid flow which method includes the steps of inspecting a coupon which has been exposed to the fluid flow in a sidestream pipeline connected to the mainstream pipeline, the improvement which comprises the steps of:
  (a) mechanically positioning one coupon in each of a plurality of adjacent openings along the longitudinal axis of the sidestream pipeline, where the surface of said coupons exposed to the fluid flow are, in a first position, aligned with, and conform to the configuration of the interior surface of the sidestream pipeline adjacent said openings;
  (b) passing the pressurized fluid through the mainstream and sidestream pipelines for a period of time and under conditions sufficient to effect a change to the interior surface of the sidestream pipeline;
  (c) mechanically withdrawing one or more but not all of the coupons from the first position to a second position on the exterior of the sidestream pipeline which is outwardly displaced from the longitudinal axis of the sidestream pipeline;
  (d) subjecting the interior surface of the sidestream pipeline to treatment by means of a combination of injections of bactericides into the sidestream pipeline and mechanical scraping of the interior surface of the sidestream pipeline while the coupon or coupons in the second position are isolated from said treatment;
  (e) relieving the pressure on the fluid in the sidestream pipeline;
  (f) removing one or more of the coupons from the sidestream pipeline; and
  (g) inspecting and comparing the coupons, whereby the effects of varied treatment means on the exposed surface of the coupons are determined.

19. In the method for monitoring the condition of the interior surface of a mainstream pipeline carrying a pressurized fluid flow which method includes the steps of inspecting a coupon which has been exposed to the fluid flow in a sidestream pipeline connected to the mainstream pipeline, the improvement which comprises the steps of:
  (a) mechanically positioning one coupon in each of a plurality of adjacent openings along the longitudinal axis of the sidestream pipeline, where the surface of said coupons exposed to the fluid flow are, in a first position, aligned with, and conform to the configuration of the interior surface of the sidestream pipeline adjacent said openings;
  (b) passing the pressurized fluid through the mainstream and sidestream pipelines for a period of time and under conditions sufficient to effect a change to the interior surface of the sidestream pipeline;
  (c) mechanically withdrawing one or more but not all of the coupons from the first position to a second position on the exterior of the sidestream pipeline which is outwardly displaced from the longitudinal axis of the sidestream pipeline;
  (d) subjecting the interior surface of the sidestream pipeline to treatment by means selected from the group consisting of mechanical cleaning devices and chemical agents while the coupon or coupons in the second position are isolated from said treatment;

(e) relieving the pressure on the fluid in the sidestream pipeline;

(f) isolating the sidestream pipeline from the mainstream fluid flow;

(g) relieving the internal pressure on the sidestream pipeline;

(h) removing one or more of the coupons from the sidestream pipeline;

(i) measuring the effects of the chemical agents and mechanical devices on the coupons;

(j) subjecting the coupons to analysis to determine the presence of organic material and corrosion, and the effects of any chemical and mechanical cleaning steps applied to the pipeline; and (k) comparing the coupons, whereby the effects of varied treatment means on the exposed surface of the coupons are determined.

20. The method of claim 19 which further comprises the steps of:

withdrawing at least one of the coupons from its position of alignment with the interior wall of the sidestream pipeline prior to treatment by chemical agents and mechanical cleaning devices so that said withdrawn coupon is not subject to the cleaning technique applied;

re-inserting said withdrawn coupon to its position of alignment with the interior wall of the sidestream pipeline after the treating step; and resuming the passage of pressurized fluid through the sidestream pipeline.

21. The method of claim 17 where at least one of the coupons is withdrawn from its position of alignment during repeated treatment of the interior surface of the sidestream pipeline by chemical agents and mechanical cleaning devices and re-inserted when passage of pressurized fluid is resumed.

* * * * *